United States Patent
Tsukihashi et al.

(10) Patent No.: US 7,184,379 B2
(45) Date of Patent: Feb. 27, 2007

(54) OPTICAL DISK RECORDING/REPRODUCING METHOD AND APPARATUS IN WHICH RECORDING PROPERTIES OF THE DISK ARE DETECTED WHEN RECORDING SPEED IS CHANGED

(75) Inventors: Akira Tsukihashi, Ohra-gun (JP); Toru Tanaka, Ota (JP); Yasushi Hanamoto, Hanyu (JP); Shinji Seki, Nitta-gun (JP); Toshihiko Hiroshima, Ota (JP); Yutaka Imamura, Sawa-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 509 days.

(21) Appl. No.: 10/080,994

(22) Filed: Feb. 20, 2002

(65) Prior Publication Data

US 2002/0150011 A1    Oct. 17, 2002

(30) Foreign Application Priority Data

Mar. 30, 2001    (JP)    ............................ 2001-099731

(51) Int. Cl.
G11B 7/0045    (2006.01)

(52) U.S. Cl. .................... 369/47.43; 369/189; 369/267; 369/47.11

(58) Field of Classification Search ............. 369/47.11, 369/47.43, 47.33, 189, 190, 239, 267
See application file for complete search history.

(56) References Cited

U.S. PATENT DOCUMENTS

| | | | |
|---|---|---|---|
| 5,487,047 A * | 1/1996 | Oka | 369/30.23 |
| 6,404,714 B1 * | 6/2002 | Choi | 369/53.12 |
| 6,418,099 B2 * | 7/2002 | Yamamoto | 369/47.11 |
| 6,487,616 B1 * | 11/2002 | Hayashi | 710/59 |
| 6,493,298 B1 * | 12/2002 | Youn | 369/47.1 |
| 6,496,458 B2 * | 12/2002 | Tsukihashi | 369/47.47 |
| 6,556,524 B1 * | 4/2003 | Takeshita | 369/47.43 |
| 6,570,831 B1 * | 5/2003 | Choi | 369/47.28 |
| 6,636,468 B2 * | 10/2003 | Salmonsen et al. | 369/47.53 |
| 6,643,233 B1 * | 11/2003 | Yen et al. | 369/47.15 |
| 6,920,094 B2 * | 7/2005 | Komaki | 369/47.33 |

FOREIGN PATENT DOCUMENTS

| | | |
|---|---|---|
| EP | 0 429 139 | 5/1991 |
| EP | 0 559 277 | 9/1993 |
| EP | 1 081 696 | 3/2001 |
| JP | 2001-067767 | 3/2001 |

* cited by examiner

Primary Examiner—Andrea Wellington
Assistant Examiner—M. V. Battaglia
(74) Attorney, Agent, or Firm—Hogan & Hartson LLP

(57) ABSTRACT

An operation for recording a recording signal onto a disk (1) is interrupted, when an amount of signal data stored in a buffer RAM (11) for temporarily storing the recording signal is less than an interruption setting value during performing of the recording operation. Moreover, when the amount of signal data stored in the buffer RAM (11) increases and indicates a resumption setting value, the signal recorded on the disk (1) before interruption is reproduced, and the recording operation is resumed based on the reproduced signal. Moreover, recording properties are detected by the signal reproduced before resumption of recording.

4 Claims, 1 Drawing Sheet

OPTICAL DISK RECORDING/REPRODUCING METHOD AND APPARATUS IN WHICH RECORDING PROPERTIES OF THE DISK ARE DETECTED WHEN RECORDING SPEED IS CHANGED

BACKGROUND OF THE INVENTION i) Field of the Invention

The present invention relates to a disk recording/reproducing apparatus which is constituted to record a signal on a disk by a pickup and to reproduce a signal recorded on the disk.

ii) Description of Related Art

Optical disk players having an optical pickup for reading signals recorded on a disk have become common items, and in recent years optical disk recording/reproducing apparatuses having a constitution including, in addition to reproduction capability, a capability of recording a signal on a disk by emitting a light beam from a laser element incorporated in the optical pickup have also become commercially available.

A typical such optical disk recording/reproducing apparatus records the signal in response to a recording command from a computer apparatus as a host apparatus. Such recording operation includes storing the signal to be recorded on the disk once in a buffer RAM, reading out the signal stored in the buffer RAM, modulating the signal, and supplying the signal to the laser element to record the signal onto the disk.

When the signal is normally recorded onto the disk, a writing operation of recording signal output from a computer apparatus into the buffer RAM, reading operation of the signal from the buffer RAM, and recording operation of the read signal onto the disk are carried out in accordance with the size of the recording signal or the situation or state of recording on the disk itself.

During the signal recording operation, when the amount of recording signal data stored in the buffer RAM becomes insufficient, signal recording onto the disk cannot continue, that is, a so-called buffer underrun state results. As a method for solving the problem, there is a known technique including steps of halting the recording operation onto the disk when the amount of the recording signal data stored in the buffer RAM falls below a predetermined value, which is an interruption setting value; and the resuming the recording operation onto the disk when the amount of the recording signal stored in the buffer RAM again exceeds a predetermined value, a resumption setting value.

In this technique, a recording interruption and resuming operation is carried out. The recording resuming operation includes reproducing the signal recorded on the disk before interruption of the recording, and resuming the recording operation based on the reproduced signal.

With this technique, the recording operation onto the disk in the optical disk recording/reproducing apparatus is carried out at a constant linear speed. However, when the disk is rotated/driven at a constant linear speed, the rotation angular speed of the disk is higher on the inner peripheral side of the disk than along the outer periphery. Therefore, it is technically difficult to rotate/drive the disk at a high linear speed constant on the inner and outer peripheral sides of the disk.

As a method for solving the problem, a technique for raising the linear speed with displacement of a recording position to the outer peripheral side from the inner peripheral side of the disk has been developed.

SUMMARY OF THE INVENTION

An advantage of the present invention is to provide an optical disk recording/reproducing apparatus in which recording can preferably be resumed after recording has been halted due to buffer underrun or changing of linear speed.

According to the present invention, in the disk recording/reproducing apparatus, recording properties are detected by a signal reproduced before the recording is resumed. Therefore, the detected recording properties can be utilized to appropriately perform various recording control operations.

Moreover, according to the present invention, because recording conditions of a recording resuming time are set based on the detected recording properties, a recording operation can be resumed with satisfactory recording conditions, and the recording properties can be enhanced.

Furthermore, according to the present invention, in the optical disk recording/reproducing apparatus in which the recording operation onto the disk is interrupted in order to change a linear recording speed, the signal recorded onto the disk before the recording interruption is reproduced, and the recording operation is resumed based on the reproduced signal, the recording properties are detected by the signal reproduced before the recording is resumed. Therefore, the recording operation can be resumed at a recording speed corresponding to various recording properties.

Additionally, according to the present invention, the linear recording speed of a recording resuming time is set in accordance with the recording properties detected based on the signal reproduced at the linear speed of the recording interruption time. Therefore, when the recording speed is not changed, it is advantageously unnecessary to perform wasteful speed changing operations.

Moreover, according to the present invention, when the detected recording properties do not meet predetermined criteria, the linear recording speed is lowered and the recording operation is resumed. This can prevent the recording properties from being deteriorated.

Furthermore, according to the present invention, when the detected recording properties cannot be reproduced, the recording operation is ended. This realizes an advantage that the wasteful recording operation can be ended quickly.

Additionally, according to the present invention, recording property data is compared with recording property data detected at a previous change time of the linear recording speed in order to detect the recording properties. Therefore, a substantially current state of change in the recording properties can be detected, and it is advantageously possible to accurately detect the recording properties.

DETAILED DESCRIPTION OF THE PREFERRED EMBODIMENTS

Figure 1:
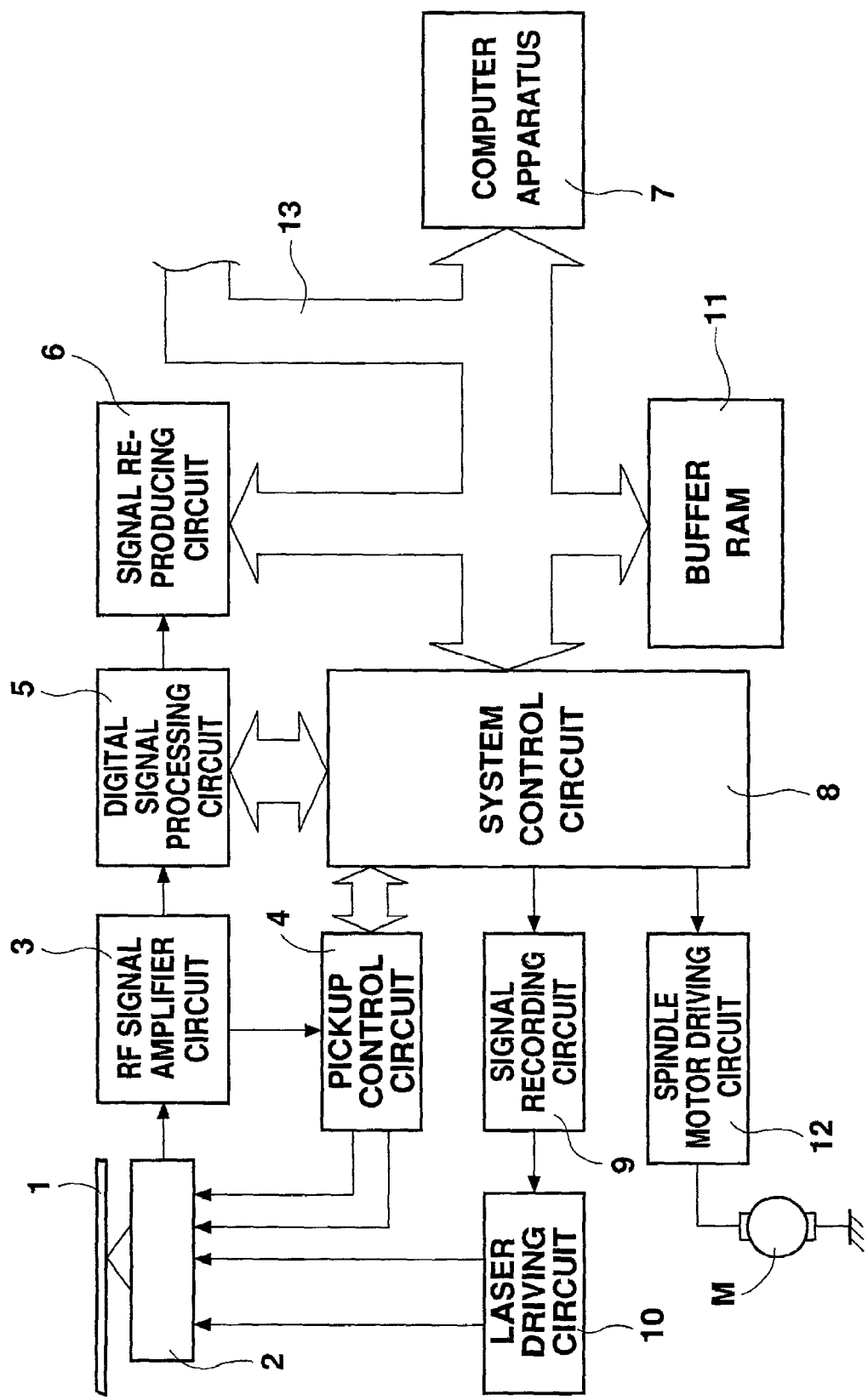
FIG. 1 is a block circuit diagram showing one embodiment of an optical disk recording/reproducing apparatus according to the present invention.

FIG. 1 is a block circuit diagram showing an optical disk recording/reproducing apparatus according to a preferred embodiment of the present invention. In FIG. 1, a reference numeral 1 denotes a disk mounted on a turntable (not shown) which is rotated/driven by a spindle motor M, and is rotated/driven by rotation of the turntable. Moreover, position information data is recorded in a groove called a wobble in the disk 1, and a recording/reproducing operation of a signal is controlled based on a wobble signal obtained from this groove. Numeral 2 denotes an optical pickup including a laser element (not shown) for irradiating the disk 1 with a light beam, a monitoring diode for monitoring a level of the light beam emitted from the laser element, and an optical detector for receiving the light beam reflected from a signal surface of the disk 1. The optical pickup is configured such that it can be moved in a direction diametric to the disk 1 by a pickup driving motor (not shown).

A reference numeral 3 denotes an RF signal amplifier circuit for amplifying an RF signal obtained from the optical detector incorporated in the optical pickup 2 and shaping a waveform. Numeral 4 denotes a pickup control circuit for performing a focusing control operation for focusing the light beam emitted from the optical pickup 2 on the signal surface of the disk 1 based on a signal obtained via the RF signal amplifier circuit 3, and a tracking control operation for causing the light beam to follow a signal track of the signal surface. The pickup control circuit further includes a focus servo circuit and tracking servo circuit.

A reference numeral 5 denotes a digital signal processing circuit for performing digital signal processing of the signal output from the RF signal amplifier circuit 3, and a demodulation operation for each type of signal. Numeral 6 denotes a signal reproducing circuit to which a digital signal obtained by processing the signal in the digital signal processing circuit 5 is input. When information recorded on the disk 1 is an audio signal, the signal reproducing circuit converts the digital signal to an analog signal, and outputs the analog signal to an amplifier. When the information is a data signal such as computer software, the digital signal is output to a computer apparatus 7 disposed as a host apparatus.

A reference numeral 8 denotes a system control circuit to which the signal demodulated by the digital signal processing circuit 5 is input, and which performs various control operations in response to a command signal output from the computer apparatus 7. Numeral 9 denotes a signal recording circuit to which recording signals such as a test signal and information signal are input and which controls a laser emission operation of a laser driving circuit 10 in response to the signal to record signals such as a data signal into the disk 1.

A reference numeral 11 denotes a buffer RAM in which the signal to be recorded on the disk 1 is temporarily stored. The RAM is configured such that the signal output from the computer apparatus 7 is written and a signal storage operation and reading operation are controlled by a control operation of the system control circuit 8. Moreover, the signal stored in the buffer RAM 11 is stored/held even after the signal is read to be recorded on the disk 1. Thereafter, when a new signal output from the computer apparatus 7 is stored in the corresponding position, the signal data is successively overwritten and deleted. Numeral 12 denotes a spindle motor driving circuit whose operation is controlled by the system control circuit 8. The spindle motor driving circuit rotates, drives, and controls the spindle motor M for rotating/driving the disk 1 at a speed for performing the recording/reproducing operation.

The computer apparatus 7 can also be connected to other optical disk recording/reproducing apparatuses and peripheral apparatuses such as a printer and scanner via a data bus 13.

In this constitution, when the signal is recorded onto the disk 1, the buffer RAM 11 stores the signal output from the computer apparatus 7, the reading operation of the stored signal is controlled, and the recording operation of the signal onto the disk 1 is thereby controlled. Moreover, after the operation for recording the signal onto the disk 1 is interrupted, and when the recording operation is resumed, the signal stored in the buffer RAM 11 is compared with the signal recorded on the disk 1 before the interruption. In the constitution, the signal is recorded in continuation with the signal recorded before the interruption. That is, the signal is recorded in a system called a seamless system.

Furthermore, while the signal is recorded onto the disk 1, a final address of a position of a normal recording operation is stored in a memory circuit disposed in the system control circuit 8. During the recording operation, the apparatus is brought to a buffer underrun state in which the amount of recording signal data stored in the buffer RAM becomes insufficient, and then the recording operation is interrupted. In such a situation, the signal can be recorded in a seamless manner from the interrupted position based on the final address stored in the memory circuit.

The optical disk recording/reproducing apparatus in the present invention is constituted as described above. A reproduction operation in the circuit constituted as described above will next be described. When the computer apparatus 7 outputs a command signal for performing the reproduction operation to the system control circuit 8 constituting a driving apparatus, the system control circuit 8 starts controlling the reproduction operation. In the reproduction operation, a driving current from which a laser output for reading out the signal is obtained is supplied to the laser element incorporated in the optical pickup 2 from the laser driving circuit 10.

When the operation for controlling the reproduction operation starts, the spindle motor driving circuit 12 controls the rotation of the spindle motor M. In the operation for controlling the rotation of the spindle motor, a synchronous signal obtained by decoding a wobble signal is compared with a reference signal output from a reference signal generation circuit (not shown), so that the disk 1 is rotated/driven at a constant linear speed. The control operation is similarly performed also in an operation for recording the signal as described below.

The rotation of the spindle motor is controlled as described above. In the optical pickup 2 for reading out the signal, the focusing and tracking control operation is started, and the optical pickup 2 begins reading the signal from the disk 1. Prior to the reproduction operation, TOC data recorded in a Lead-In region constituting a first section of the disk 1 is read out.

An operation for reading and reproducing the signal recorded in a signal recording region of the first session of the disk 1 is performed based on the TOC data recorded in the read-in region. The signal read out by the optical pickup 2 is passed through the RF signal amplifier circuit 3 and amplified. After the waveform is shaped, the signal is input into the digital signal processing circuit 5, and demodulated. When the digital signal processing circuit 5 processes the signal and extracts information data, the information data is subjected to signal processing such as error correction, and the signal is applied to the signal reproducing circuit 6.

Moreover, when the information data read from the disk 1 is an audio signal, the signal reproducing circuit 6 converts the signal to an analog signal, and outputs the signal to an amplifier. When the information data is a data signal such as computer software, the digital signal is output to the computer apparatus 7.

The reproduction operation in the present embodiment is performed as described above. An operation for recording the signal onto the disk 1 will next be described.

The operation for recording the signal onto the disk 1 includes recording a test signal in a trial writing region disposed in the disk 1 so that a laser output most suitable for properties of the disk 1 is set. Such setting operation includes changing the laser output, recording the test signal, and reproducing the recorded signal.

When the laser output is set, information data recorded in a buffer region of the disk 1, that is, position information of the signal recorded in a signal recording region, is read out. Therefore, it is possible to record the data signal in the signal recording region disposed in the disk 1 based on the information data read as described above. Moreover, a position for performing the recording operation can be recognized.

After completion of such a recognition processing operation, the optical pickup 2 is moved to a position in which the recording operation on the disk 1 is started, and the recording signal is written into the buffer RAM 11. When the signal is written in the buffer RAM 11, the amount of signal data stored in the buffer RAM 11 gradually increases. When the amount of stored data exceeds a predetermined amount, the signal is read from the buffer RAM 11, and the read signal is input into the signal recording circuit 9. As a result, the signal recording circuit 9 controls the laser driving circuit 10, and the signal is recorded on the disk 1.

The signal is recorded onto the disk 1 through the aforementioned operation, and the signal is written into the buffer RAM 11 in response to the signal read from the buffer RAM 11. Moreover, while the recording operation is performed, an address indicating the position of each recording operation of the signal onto the disk 1, that is, a final address, is stored in the memory circuit.

Furthermore, while the signal is recorded onto the disk 1, the amount of the signal output from the computer apparatus 7 and written in the buffer RAM 11 is reduced as compared with the amount of the signal read to be recorded on the disk 1. Then, the amount of the recording signal stored in the buffer RAM 11 gradually decreases. The amount of the recording signal stored in the buffer RAM 11 decreases and indicates a predetermined amount (interruption setting value). That is, in the buffer under-run state, a control operation is performed so that the recording operation onto the disk 1 is interrupted. When the interruption operation is performed, the operation for reading the signal from the buffer RAM 11 is also interrupted.

When the computer apparatus 7 outputs the recording signal in this state, the control operation for writing the recording signal into the buffer RAM 11 is performed, and the amount of the recording signal stored in the buffer RAM 11 gradually increases. When the amount of the recording signal stored in the buffer RAM 11 increases and indicates a predetermined amount (resumption setting value), a control operation is performed to resume the recording operation.

The recording resuming operation includes displacing the optical pickup 2 in a position for starting the recording operation, that is, a position moved backwards from a position in which the recording operation has been interrupted, and performing the reproduction operation from this position. The recording interruption position can easily be recognized from the final address stored in the memory circuit each time the normal recording operation is performed. Additionally, the optical pickup 2 can be moved to a position before the interruption position.

The signal reproduced by the reproduction operation is a signal which has been recorded immediately before the interruption of the recording operation, and the reproduced signal is compared with the signal stored in the buffer RAM 11. When both signals are judged to be the same signal in the comparison operation, the signal stored following the signal as an object of the comparison operation in the buffer RAM 11 is read out. The signal is input to the signal recording circuit 9 and the recording operation of the signal onto the disk 1 is resumed. The interruption and resumption of the recording of the signal onto the disk 1 can be accomplished by the aforementioned operation. Through such an operation, a continuous signal can be recorded onto the disk 1, even after the recording operation has been interrupted. That is, a so-called seamless recording operation can be performed.

The operation for recording the signal in the present embodiment is performed as described above. The present invention will further be described.

When the amount of the signal stored in the buffer RAM 11 becomes insufficient, that is, when the apparatus is brought to a buffer underrun state, the recording interruption and resuming operation is performed as described above. The operation for resuming the recording is performed based on the reproduction operation of the signal recorded on the disk 1. According to the present invention, when the signal reproduced by the reproduction operation, that is, the signal recorded on the disk 1 before the recording interruption is reproduced, the recording properties of the reproduced signal are detected.

An operation for detecting the recording properties may include detecting changes of predetermined recording properties such as jitter and read signal strength from the reproduced signal. That is, when a laser output value differs, a shape of a formed pit and a read signal level also differ. Therefore, it is possible to detect the recording properties, that is, a relationship between the laser output value and the read signal level (pit shape) based on the read signal level. Moreover, the recording properties of the signal recorded before the recording interruption can be detected based on changes detected in the recording properties. It is possible to judge, by the detected properties, whether the recording operation is being performed normally and whether a recording level is satisfactory.

In the operation for detecting the recording properties, the recording properties are judged to determine whether they are flawed to such an extent that the signal cannot be reproduced and, when so determined, the recording operation is interrupted. Moreover, when recording properties are judged to be deteriorated to a less than optimum state, recording conditions for performing the recording operation, such as laser output and focusing, are changed, and then the recording resuming operation is performed. By resetting recording conditions in this manner, satisfactory continuity of the signal recorded through the recording interruption and resuming operation can be maintained.

A recording control method with occurrence of buffer underrun has been described above. An operation involving a change in recording speed will next be described. For the operation for changing the recording speed, in a state in which the recording operation is performed in a constant linear speed state on an inner peripheral side of the disk 1, a recording position is moved to a position in which the recording operation can be performed in a constant higher linear speed state. The speed is changed as the recording position is changed.

For the operation for changing the linear speed, for example, a speed of 16 times a prescribed linear speed (16× recording) is changed to that of 18 times the linear speed (18× recording). To perform the changing operation in this manner, it is necessary to resume the recording operation after the recording operation is once interrupted. That is, the recording operation performed in the constant state of 16 times the linear speed is once interrupted. Thereafter, when the disk 1 is rotated/driven at a constant state at a rotation speed of 18 times the linear speed, a control operation for resuming the recording operation is performed. The recording interruption and resuming operation can be performed using the recording control method with the occurrence of the buffer underrun.

That is, even when the linear recording speed is changed, the recording properties of the signal recorded on the disk 1 before the interruption of recording are detected from the reproduced signal. That is, it is judged from received light strength, jitter, and the like whether or not the read signal is in a satisfactory state. The recording properties are detected in the linear speed when a recording is interrupted. That is, the detection operation is performed before the linear recording speed is changed. Moreover, during the operation for detecting the recording properties, the recording properties are judged to determine if they are flawed to such an extent that the signal cannot be reproduced. When so determined, the recording operation is halted.

Furthermore, when the recording properties are judged to be deteriorated from optimum properties, the recording conditions such as the laser output for performing the recording operation are changed, and then the recording operation is resumed. By resetting recording conditions are changed in this manner, the continuity of the recorded signal can be maintained to be satisfactory by the recording interruption and resuming operation. Moreover, the recording speed of a recording resuming time can be set based on a satisfaction level of the detected recording properties.

That is, when the detected recording properties are judged to be better than predetermined properties, the control operation is performed to change the linear speed to a speed higher than the linear recording speed of the interruption time by one step; when the detected recording properties are judged to be the predetermined properties, the control operation is performed to resume the recording operation at the same linear speed as the linear recording speed of the interruption time; and, when the detected recording properties are judged to be worse than the predetermined properties, the control operation is performed to change the linear speed to a speed lower than the linear recording speed of the interruption time by one step.

The recording speed of the recording resuming time can be set in accordance with the detected recording properties as described above. A comparison object in judging whether or not the recording properties are satisfactory can be the predetermined recording properties, but recording properties data detected at a previous change time of the recording speed can also be utilized. Because the recording property data is obtained during the recording operation, the recording properties can be detected accurately, and changes in the recording properties can be detected in a near realtime condition.

What is claimed is:

1. An optical disk recording/reproducing apparatus, the apparatus comprising interruption means for interrupting a recording operation for recording onto a disk, reproducing means for reproducing a signal recorded on the disk before the recording operation is interrupted, comparing means for comparing the reproduced signal and a signal stored in a buffer RAM for temporarily storing a recording signal, resuming means for resuming the recording operation when the compared signals are determined to be identical to each other, wherein recording properties are detected based on a signal reproduced before the recording operation is resumed, to set the recording linear speed for resuming the recording operation, depending on whether the detected recording properties are determined to be satisfactory or unsatisfactory, and detection means for detecting a change in recording properties through comparison between recording property data detected based on a signal reproduced before the recording operation is resumed and recording property data detected at a previous point of change of the recording linear speed, to thereby determine whether or not the recording properties have become better.

2. An optical disk recording/reproducing apparatus according to claim 1, wherein, when the recording properties of a signal reproduced before the recording operation is resumed are detected without changing the recording linear speed, the recording/reproducing apparatus includes means for causing the recording operation to terminate when it is determined based on the detected recording properties that recording quality is insufficient to allow a signal to be reproduced.

3. A method for recording/reproducing comprising:

interrupting a recording operation for recording onto a disk when a recording linear speed is to be changed;

reproducing a signal recorded on the disk before interrupting a recording operation;

comparing the reproduced signal and a signal stored in a buffer RAM for temporarily storing a recording signal; and resuming the recording operation when the compared signals are determined to be identical to each other;

wherein recording properties are detected based on a signal reproduced before the recording operation is resumed to set the recording linear speed for resuming the recording operation, depending on whether the detected recording properties are determined to be satisfactory or unsatisfactory, and further including detecting a change in recording properties through comparison between recording property data detected based on a signal reproduced before the recording operation is resumed and detecting recording property data at a previous point of change of the recording linear speed, to thereby determine whether or not the recording properties have become better.

4. The recording/reproducing method according to claim 3, further including, when the recording properties of a signal reproduced before the recording operation is resumed are detected without changing the recording linear speed, terminating the recording operation by the recording/reproducing apparatus when it is determined based on the detected recording properties that recording quality is insufficient to allow a signal to be reproduced.

* * * * *